United States Patent
Arndt et al.

[11] Patent Number: 6,088,098
[45] Date of Patent: Jul. 11, 2000

[54] CALIBRATION METHOD FOR A LASER-BASED SPLIT-BEAM METHOD

[75] Inventors: Stefan Arndt, Stuttgart; Klaus Reymann; Michael Huebel, both of Gerlingen, all of Germany

[73] Assignee: Robert Bosch GmbH, Stuttgart, Germany

[21] Appl. No.: 09/231,680

[22] Filed: Jan. 14, 1999

[30] Foreign Application Priority Data

Jan. 17, 1998 [DE] Germany ............... 198 01 615

[51] Int. Cl.⁷ .................. G01N 21/00; G01J 1/02; G01P 3/36
[52] U.S. Cl. .................. 356/339; 356/243.2; 356/28
[58] Field of Search .................... 356/339, 336, 356/338, 341, 27, 243.2, 28, 28.5, 239.5; 73/861.06, 861.05; 382/278, 107; 250/222.2; 364/509, 510

[56] References Cited

U.S. PATENT DOCUMENTS

| | | |
|---|---|---|
| 4,866,639 | 9/1989 | Adrian . |
| 4,919,536 | 4/1990 | Komine ................ 356/28 |
| 5,365,343 | 11/1994 | Knapp ............... 356/239.5 |
| 5,491,642 | 2/1996 | Wormell et al. ............ 364/508 |

FOREIGN PATENT DOCUMENTS

| | | |
|---|---|---|
| 0 763 884 A1 | 3/1997 | European Pat. Off. . |
| 44 38 569 | 5/1996 | Germany . |
| 90/10876 | 9/1990 | WIPO . |

Primary Examiner—Hoa Q. Pham
Attorney, Agent, or Firm—Kenyon & Kenyon

[57] ABSTRACT

A method for the quantitative acquisition of flow patterns in fluid flows in which a medium (e.g., a gas or a liquid) and the particles contained therein and carried in the flow are set in motion in a transparent flow object. The method provides that a flow object is transilluminated by a laser light fanned out on a plane parallel to the longitudinal axis of the flow object. A scattering of the laser light by the particles is detected by a camera positioned at a right angle to the longitudinal channel axis and moving in the vertical and horizontal directions, and can be analyzed with an analysis unit connected downstream from the camera. The analysis unit is calibrated by quantitatively comparing an image, which has an object-to-image ratio and which is recorded inside the flow object by the camera, to an image having an object-to-image ratio and recorded outside the flow object.

12 Claims, 5 Drawing Sheets

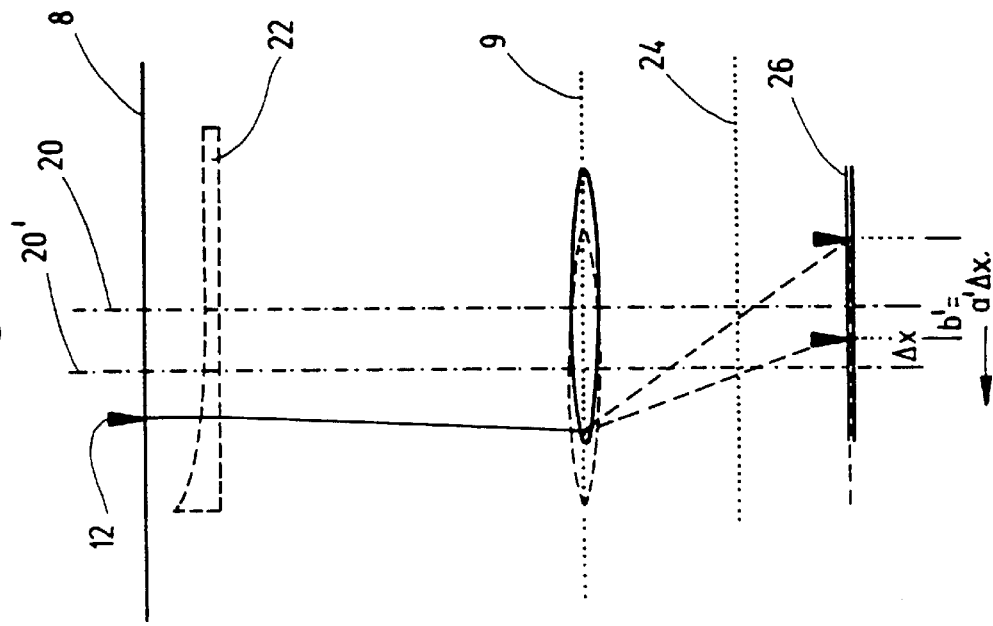
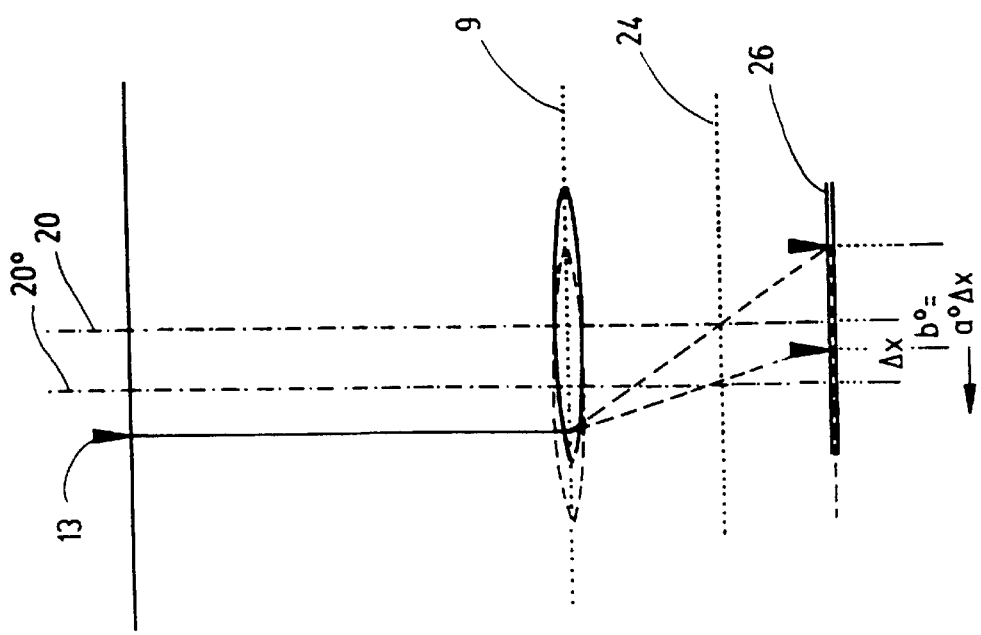

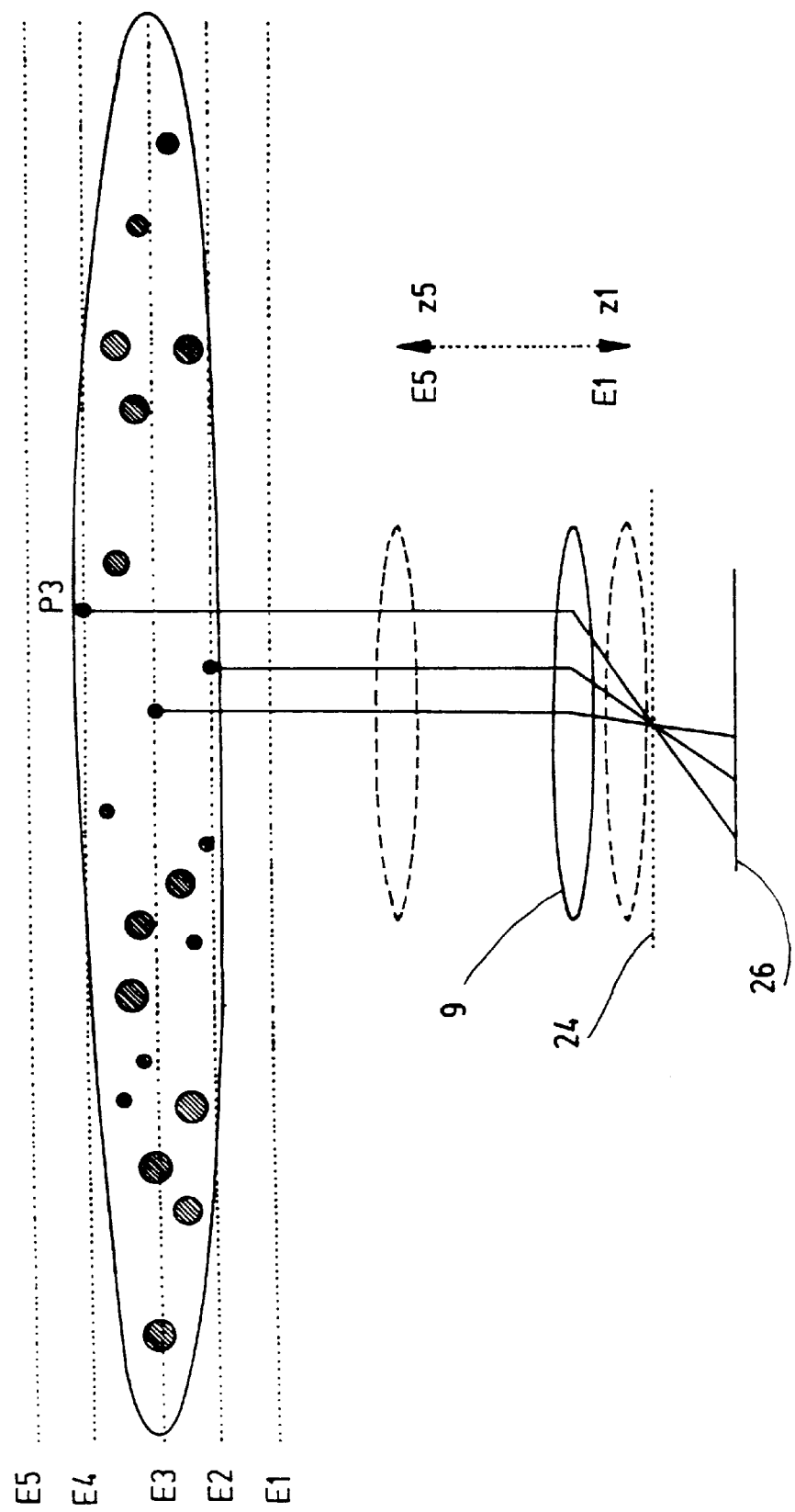

CALIBRATION METHOD FOR A LASER-BASED SPLIT-BEAM METHOD

BACKGROUND INFORMATION

In experimental fluid mechanics, a visualization of flow patterns using a laser-based split-beam method is a conventional technique for obtaining a qualitative and/or quantitative analysis of the flow patterns. In an exemplary manner, a laser beam is fanned out into an approximately two-dimensional light plane, thereby illuminating a liquid or gas flow and the particles contained therein. Fanning out the beam to form a light section with a maximum thickness of just a few millimeters (up to 2 or 3 mm), which can thus be viewed more or less as a two-dimensional light plane, can be achieved, e.g., using an optical deflection unit with a rotating mirror or using a cylindrical lens. The particles added to the flow medium emit scattered light upon passage of the light segment.

The particles themselves must be able to follow the flow with as little drift as possible and should vary only minimally during the measurement. The laser light scatter triggered by the particles being carried in the flow can be detected by the naked eye, using video equipment, photography, or by other means. Both qualitative and quantitative analyses of the optical refraction and scatter phenomena can be carried out. A quantitative analysis is based on illumination of the flow field on the light section plane, using a continuous wave laser. In principle, exposure time t over the luminosity period of the laser can be set. With a known exposure time t and a known object-to-image ratio a of the camera or the optical system, distance s or flow velocity v can be measured by analyzing particle trail a·s on the image, using the relation v=a·s/t.

A particle image velocimetry (PIV) method is a conventional method, in which a pulsed laser is used to double-expose the flow field. A determination of a·s is provided in a similar manner from the distance between points in associated pairs of points and from the pulse interval.

Quantitative analyses of the images, however, require object-to-image ratio a to be first calibrated. The relevant geometric, optical and recording parameters must either be known or determined through measurements. Calibrations of this type or corrections to influencing recording parameters are relatively complicated and must be either redetermined or calculated each time an individual parameter changes.

SUMMARY OF THE INVENTION

A method according to the present invention for calibrating flow analysis methods that uses a laser-based split-beam method is advantageous in that the acquisition and analysis unit can be adjusted quickly and precisely without complicated calculation or measurement of the apparatus used. In particular, in the case of high-performance image processing systems, the method can be used for highly accurate and fast calibrations. Changes in the imaging characteristics, focal length of the measuring optical system, and light section illumination can be taken into account without problems by recalibrating the apparatus. In contrast, calculating the imaging characteristics is much more complicated and cannot easily take into account distortions and imaging errors caused by the apparatus. Direct calibration of the model intended for operation before and/or after actual flow recording almost entirely avoids drift problems caused by various influences of all types. Calibration contours do not have to be provided in the flow field, which eliminates the cost of converting the measuring apparatus of the model. This also largely avoids possible errors in the flow geometry. The measurement data determined by calibration is immediately available in the image processing system for recalculating the flow images.

BRIEF DESCRIPTION OF THE DRAWINGS

FIG. 3a shows a first schematic representation of a camera displacement by Δx.

FIG. 3b shows a second schematic representation of the camera displacement by Δx.

FIG. 4a shows a schematic representation of a three-dimensional recording of a laser light section.

DETAILED DESCRIPTION

Figure 1:
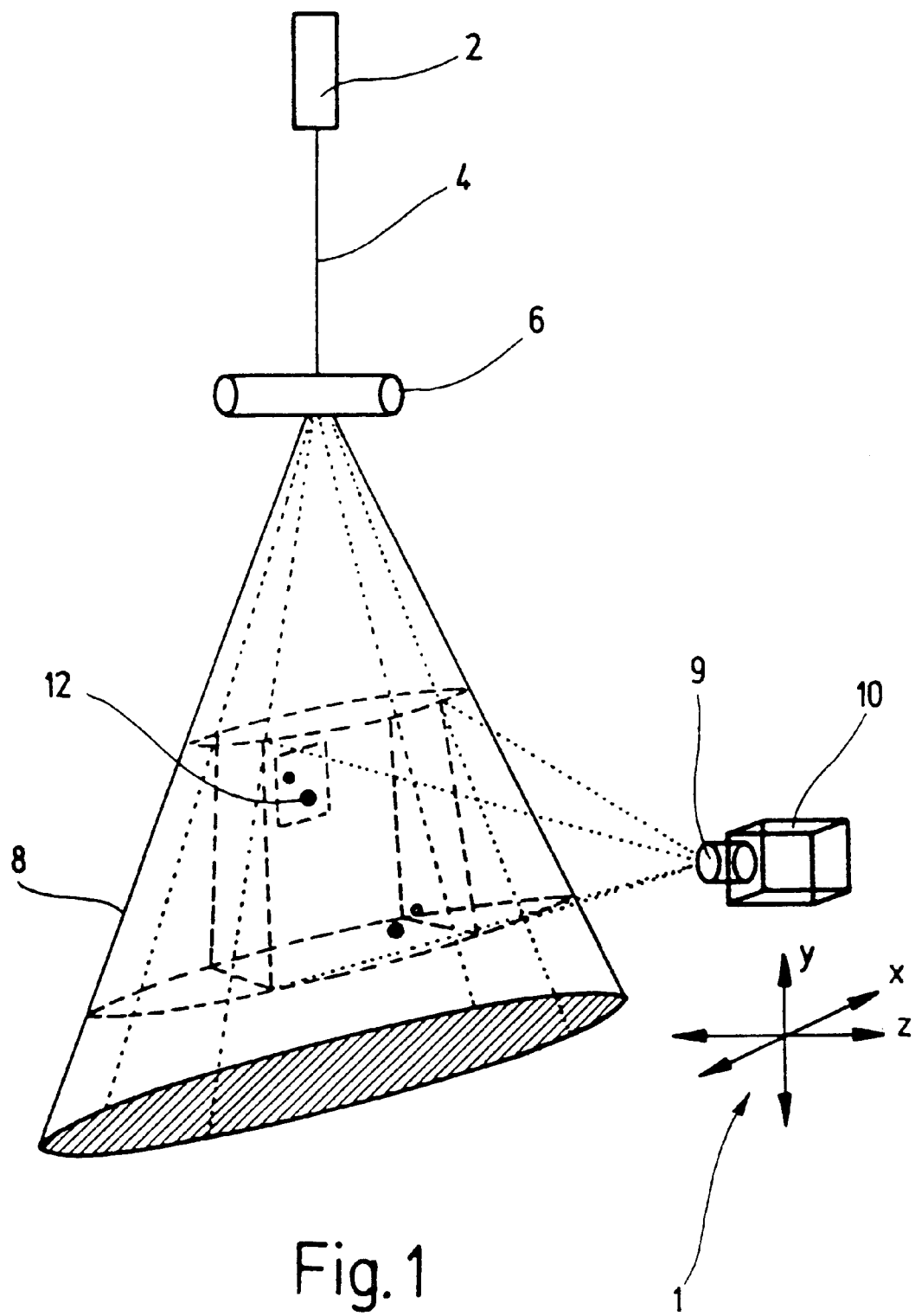
FIG. 1 shows a perspective view of an exemplary layout of a laser-based split-beam method.

FIG. 1 shows a perspective view of an exemplary layout of a laser-based split-beam method for a quantitative analysis of flow. For this purpose, a gas or liquid flow, which contains fine solid particles in order to visualize the flow patterns, is observed in a transparent flow object, for example a flow channel. In the case of gas flows, mist droplets, which can be added to the flow as tracer particles, are also suitable for use instead of the solid particles. For the purpose of clarity, the flow field to be studied, which contains the particles or droplets being carried in the gas or liquid flow, is represented by just a few particles 12. An x-y-z coordinate system 1 is illustrated to clarify the spatial orientation of the entire measuring arrangement, as well as the possible swivel and sliding directions of a detecting device (e.g., a camera).

A laser light source 2 generates a laser beam 4 which runs vertically downward, according to illustrated coordinate system 1, in the negative y direction. Laser beam 4 is fanned out into a two-dimensional x-y light plane, or a light section plane 8, using a cylindrical lens 6 located in the beam path. A finite thickness, i.e. a slight dimension of light section plane 8 in the z direction, will be left out of consideration for the present discussion. Particles 12, which scatter the laser light of light section plane 8, are carried in the gas or liquid flow, thereby making it possible to visualize flow patterns. In the embodiment shown in FIG. 1, the scatter patterns are detected by a camera 10, which supplies the recorded images to a downstream analysis unit or an image processing system (not illustrated). The acquisition equipment can be an analog camera, and preferably a digital camera, with a high frame frequency which ensures a precise analysis and can supply the signals needed for precise calibration.

Camera 10 is mounted on an adjustment device (also not shown here), which is controlled by a suitable control device and allows for translatory motions of camera 10 by defined amounts in the horizontal (x-) and vertical (y-) directions. For very small distances, these x-y displacements can also be approximated by swiveling camera 10, which also slightly changes the direction of observation. For this reason, camera 10 should not be swiveled, but rather only translatory motions should take place. A displacement in the z direction, i.e., at right angles to light section plane 8, is also possible.

In order to obtain a clear image of light section plane 8 in the flow field, a lens 9 of camera 10 is focused on the distance to this plane. If optically distorting elements (which are not illustrated in the drawing) lie in the beam path of the scattered light between the flow channel and camera 10, it is necessary, in order to obtain quantitatively reliable measurement data, to know and correct the influences of this data on the object-to-image ratio. Distortions of this type can be produced, for example, by curvatures or other refractive effects of the transparent flow model or object.

Figure 2A:
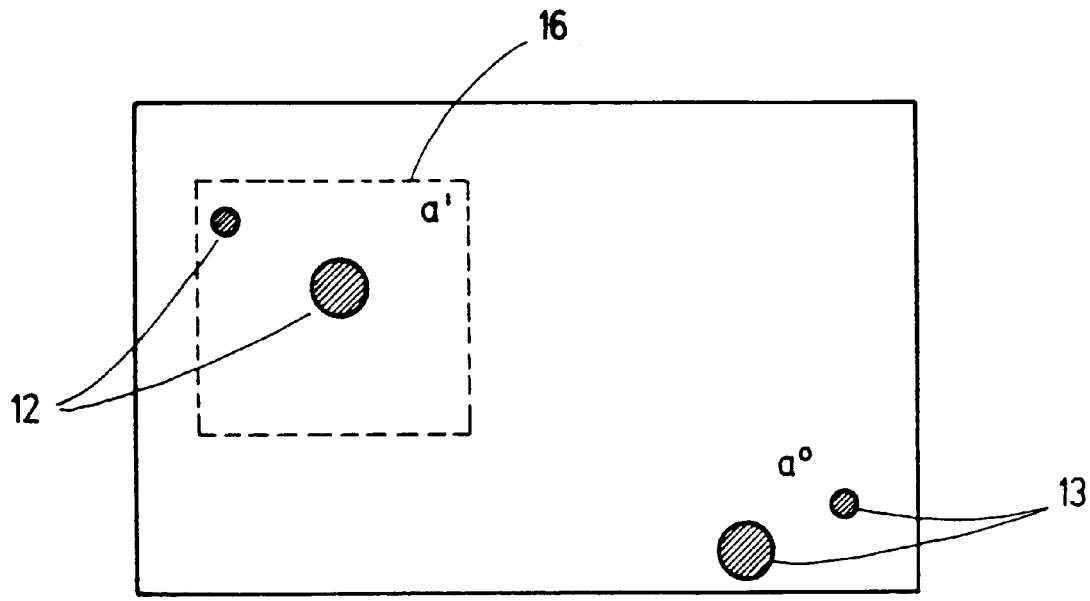
FIG. 2a shows a segment of a flow in a light section.
Figure 2B:
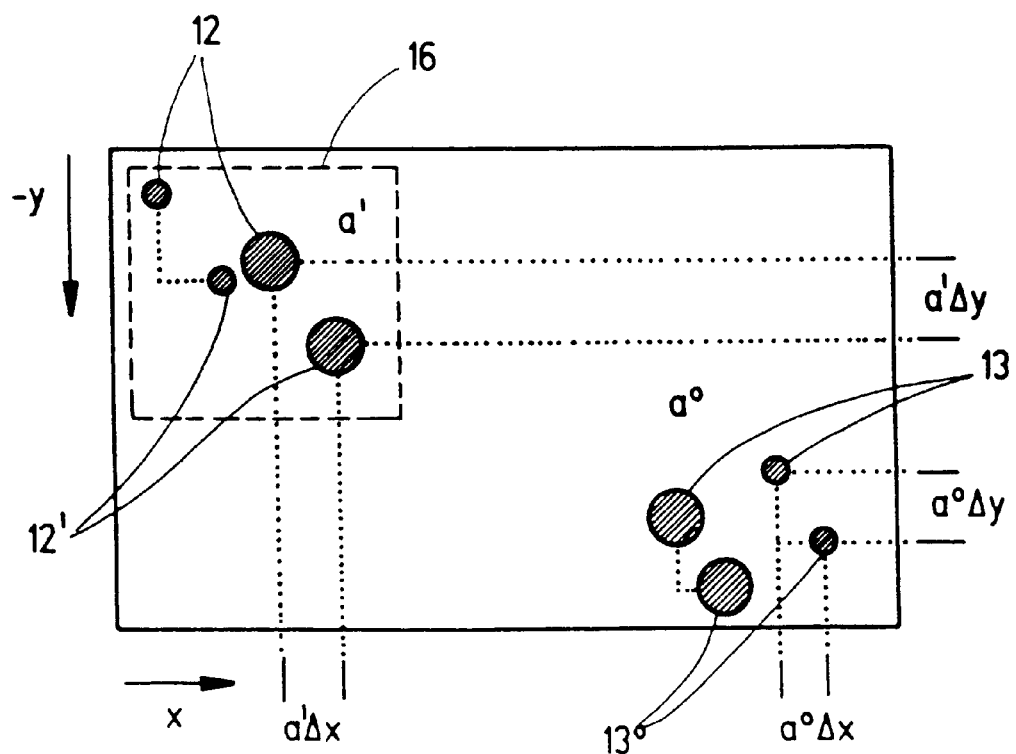
FIG. 2b shows a double image of the segment shown in FIG. 2a with a displaced camera.

FIGS. 2a and 2b show two different object-to-image ratios, a' inside and a° outside the optically distorting flow object, made visible by a translatory motion of camera 10. To minimize the effects of the particles' own movement, the displacement or translatory motion of camera 10 should be very fast. The same components illustrated in FIG. 1 are provided with the same reference numbers and are not further explained.

In an exemplary camera segment, FIG. 2a shows an image of several particles 12, carried in the flow, which are located in an optically distorted region 16, for example in the transparent flow object or flow channel. The same segment shows additional particles 13 as reference objects, which are located in a region without distorted imaging, for example in air. The object-to-image ratio of particles 13 imaged without distortion is identified below by a°, while the object-to-image ratio for particles 12 imaged with distortion in the flow object are identified on the light section plane by a°.

FIG. 2b shows a camera segment with a double-representation of imaged particles 12, 12', 13, 13° and objects from FIG. 2a. The double representation indicates a defined translatory motion of camera 10 in the x and/or y direction, which makes it possible to compare the distances of the objects inside and outside light section plane 8, thus calibrating the object-to-image ratio. In FIG. 2b, the same particles 12, 13 are imaged as in FIG. 2a. A rapid translatory motion of camera 10 in the negative y direction and positive x direction of light section 8 is illustrated by imaging particles 12' in optically distorted region 16 with object-to-image ratio a' and by imaging particles 13° in the optically undistorted region with object-to-image ratio a°. The same particles 12, 12' appear in optically distorted region 16 in both camera perspectives before and after the translatory motion, positioned at a distance of a'·Δx from each other in the x direction or a'·Δy in the y direction. The same particles 13, 13° appear in the optically undistorted region in both camera perspectives before and after the translatory motion, positioned at a distance of a°·Δx from each other in the x direction or a°·Δy in the y direction. Because object-to-image ratio a° in the undistorted region, for example in air, differs from object-to-image ratio a' in optically distorted region 16, the differences due to the optical distortion in region 16 can be evaluated, correcting the optical distortion by computation in the downstream analysis unit in order to obtain error-free, quantitative results for the measurements.

FIGS. 3a and 3b each show schematic representations illustrating a defined displacement of camera 10, indicated by an optical axis 20 of camera 10, by a specific amount Δx in the x direction. The same components illustrated in the previous figures are provided with the same reference numbers and are not further explained. Lens 9 of camera 10 is first adjusted the necessary amount to the measured object, i.e. the flow object or flow channel. This is done by focusing lens 9 or, if a zoom lens is used, setting the focal length until a clear image of an object at which the camera is aimed is obtained. These values are retained for the reference measurement. The calibration object is then brought into focus merely by changing distance Δz between camera 10 and the object at which it is aimed.

FIG. 3a shows the displacement of camera 10 by Δx in object-to-image ratio. a°, i.e., without any optically distorting influences between the image plane and camera 10, with only optical axis 20 of the camera being illustrated for reasons of clarity. With a fixed lens setting, i.e., a fixed focus of lens 9, or a fixed focal length if using a zoom lens, camera 10 is first aimed at an object or a particle 13 outside the flow model, and distance Δx between camera 10 and this particle 13 varied until a clear image of the particle is obtained on an image plane 26 of camera 10. To further clarify the optical path, a focal plane 24 is also illustrated between lens 9 and image plane 26. The focus of lens 9 is not varied. If the camera then undergoes a defined motion in the x and/or y direction, the object also moves by distance a°·Δx or a°·Δy on the image plane. As shown in FIG. 3a, for example, camera 10 is displaced by amount Δx, with its optical axis 20 also being displaced by the same amount, illustrated in FIG. 3a as displaced optical axis 20°. The image of particle 13 on image plane 26 is likewise displaced by a defined amount b°=a°·Δx, where object-to-image ratio a° represents the factor needed for calibration. The camera is then aimed again at light section plane 8 in the flow channel, which is described below in respect to FIG. 3b.

FIG. 3b also shows a displacement of camera 10 by Δx. In this case, however, an optical distortion 22 occurs between light section plane 8 and lens 9 of camera 10, for example in the form of a curved surface of the transparent flow object. The object-to-image ratio that occurs here is identified by a'. Since the focus was not changed after recording particle 13 in the optically undistorted region, a clear image is also obtained of light section plane 8 and a particle 12 floating in it. If the flow is turned off, particles 12 float on light section plane 8 illuminated by the laser light, and an irregular point image of the illuminated, fluid-filled flow field is formed. If camera 10 now undergoes another defined movement in the x and/or y direction, a displaced image of the point structure is obtained, like in the measurements taken in air. In this case, however, a variable image spacing b' of the point pairs is obtained, depending on the local, optical distortions.

The optical distortions can be interpreted as local deviations from object-to-image ratio a° using scaling matrix a'. A comparison to the image in air yields local object-to-image ratios a'=b'·a°/b°. To avoid errors caused by a slight movement of the particles themselves (which only appear to be stationary) between the two recordings, the translatory motion of the camera must be very fast. The motion must be very much faster than the movement of particles' 12, 13 own movement. If the field of vision contains undistorted regions with an object-to-image ratio a°, or if there are geometrically known contours in the light field, the initial measurement in air can be omitted.

Figure 4B:
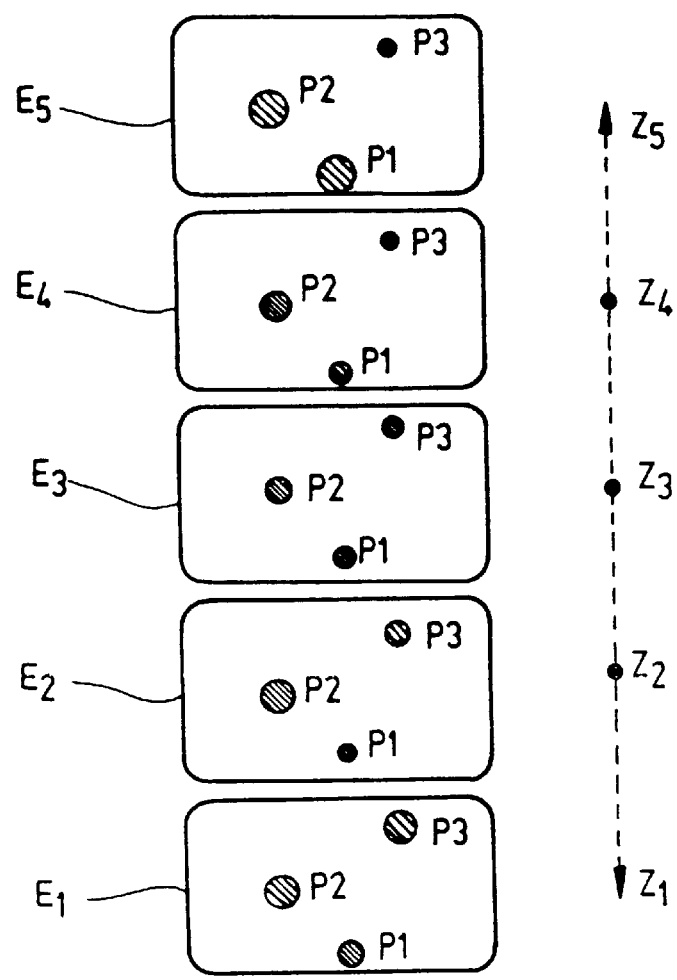
FIG. 4b shows recorded flow images on a series of vertical planes of a laser light segment.
Figure 4C:
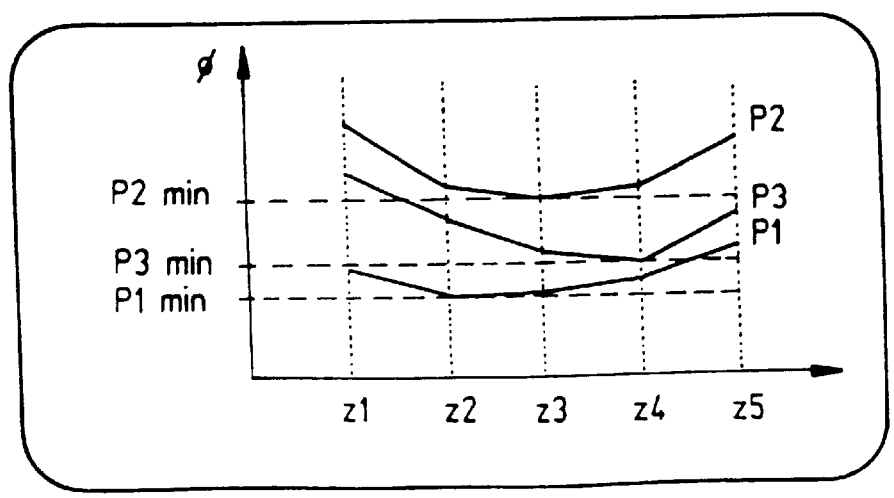
FIG. 4c shows a correlation of expansion of several particles on the different planes of the laser light section.

FIGS. 4a through 4c show an expanded measurement technique for measuring and analyzing a spatial dimension of laser light section 8 by additionally considering the slight dimension in the z direction. Due to the distribution of intensity in the laser beam, and because it is produced with cylindrical lenses, this type of light section usually has a gaussian intensity structure in the z direction and an elliptical outer contour when cut along the x-z plane. The spatial dimension of the light section can be measured in the flow field. While maintaining the focus of one setting and reducing the depth of field (with an open aperture), the camera undergoes a defined displacement in the z direction. This produces a sequence of images of the nearly stationary flow field, with the displacement speed of the camera in the z direction once again being much faster than the movement of the particles in the fluid. The displacement range must be selected so that the focus limits in both z directions always lie completely outside the depth dimension of the light section. Because the particles are nearly stationary during the rapid sequence of images, i.e. they remain more or less in the same place, the same pattern of imaged particles appears in each image, with the planar dimension, i.e., the imaged particle diameter and the intensity or optical transmission density of an imaged particle, varying along with the degree of focus. In addition, an image of the spatial structure of the light section, i.e., a distribution matrix, can be formed by analyzing all recorded particles in the measurement field and the spatial assignment to different planes, using the analysis unit.

In a schematic representation of a cut through the thin x-z plane of laser light section 8, FIG. 4a shows an exemplary method for measuring the spatial distribution of particles in the light section. Camera 10 in this case is focussed, for example, on five different uniformly spaced planes in the z direction, referred to here as E1 through E5. Various particles, referred to here as P1, P2, P3, etc., are imaged at the same point on image plane 26 with each camera setting.

FIG. 4b shows this correlation, for each image sequence, in five individual images of five planes E1 through E5 taken with camera 10. When a clear image of a particle is obtained, it has a minimal dimension (diameter) on the photograph and a maximum intensity (optical transmission density). A clear image of each particle, with a minimum image area, in the flow field is thus obtained on at least one image in the sequence. The image of the plane on which a specific particle with minimum dimension and maximum optical transmission density is imaged is therefore provided by plane E1 through E5, on which the particle is located, at a defined distance from camera 10.

FIG. 4c shows a diagram illustrating the correlation of the image area with consecutive images in a sequence for several sample particles P1, P2, and P3. The various distances of the focussing plane of camera 10 in the z direction are plotted on the horizontal axis, which corresponds to various planes E1 through E5. The vertical axis of the diagram shows the various imaged diameters of the particles. This shows that the image area for each particle in at least one image reaches a minimum value ($p1_{min}$, $p2_{min}$, $p3_{min}$). If the diameters of two particles, or their optical transmission densities, lie on the same level in two consecutive images, these particles lie precisely between the focusing distances of these two images.

What is claimed is:

1. A method for quantitatively acquiring a flow pattern in a flow of a fluid, comprising the steps of:
   a) in a transparent flow object, actuating a motion of a medium and particles contained in the medium, the particles being carried in the flow;
   b) transilluminating the transparent flow object with a laser light, the laser light being fanned out on a plane which is parallel to a longitudinal channel axis of the transparent flow object;
   c) with a camera, detecting a scattering of the laser light by the particles by moving the camera in a vertical direction and a horizontal direction, the camera being positioned at a right angle to the longitudinal channel axis;
   d) analyzing the scattering of the laser light using an analysis unit, the analysis unit being coupled downstream from the camera;
   e) recording a first image of the particles inside of the transparent flow object using the camera, the first image having a first object-to-image ratio;
   f) recording a second image of the particles outside of the transparent flow object using the camera, the second image having a second object-to-image ratio; and
   g) calibrating the analysis unit by quantitatively comparing the first image to the second image.

2. The method according to claim 1,
   wherein step (f) includes the substep of recording particular images of first particles of the particles,
   wherein, in step (c), the camera is moved for a predetermined distance in at least one of the horizontal direction and the vertical direction, the camera being moved at a high translatory speed, and
   further comprising the steps of:
   h) recording a first distance of a first one of the particular images in at least one of the horizontal direction and the vertical direction;
   i) recording a second distance of a second one of the particular images in at least one of the horizontal direction and the vertical direction, the first and second distances being determined as a function of the predetermined distance, wherein step (d) includes the substep of quantitatively analyzing the first and second ones of the particular images using the analysis unit; and
   j) determining the second object-to-image ratio using the analyzed first and second ones of the particular images.

3. The method according to claim 2,
   wherein step (f) includes the substep of recording further images of second particles of the particles,
   wherein, in step (e), the camera is moved for a further distance in at least one of the horizontal direction and the vertical direction, the camera being moved at the high translatory speed, and
   further comprising the steps of:
   k) recording a third distance a first one of the further images in at least one of the horizontal direction and the vertical direction of;
   l) recording a third distance of a second one of the further images in at least one of the horizontal direction and the vertical direction, the third and fourth distances being determined as a function of the further distance, wherein step (d) includes the substep of quantitatively analyzing the first and second ones of the further images using the analysis unit; and
   m) determining the first object-to-image ratio using the analyzed first and second ones of the further images.

4. The method according to claim 3, further comprising the steps of:
   n) comparing the first object-to-image ratio with the second object-to-image ratio to obtain a comparison value; and
   o) calculating a quantitative correction to image distortions as a function of the comparison value.

5. The method according to claim 1, wherein the transparent flow pattern includes a three-dimensional flow pattern, the three-dimensional flow pattern being evaluated by analyzing a movement of the particles in a small thickness dimension of an illuminated portion of the three-dimensional flow object.

6. The method according to claim 5, wherein step (c) includes the substep of moving the camera in a z direction to obtain a quantitative analysis of the three-dimensional flow pattern.

7. The method according to claim 6, wherein the camera has a lens which is focusable on particular planes, the particular planes being positioned at different distances from the camera.

8. The method according to claim 7, further comprising the step of:
   p) determining a respective distance between individual ones of the particles and the camera by analyzing at least one of an imaged particle diameter and an optical transmission density of each respective one of the particles.

9. The method according to claim 8, wherein each of the particles provides at least one respective image which has a minimum diameter and a maximum optical transmission density, and wherein the camera performs a focusing procedure, the focusing procedure being evaluated using the respective distance between at least one of the particles and the camera.

10. The method according to claim 9, further comprising the step of:
    q) calculating a spatial distribution matrix of the illuminated portion of the three-dimensional flow object using the analysis unit by evaluating all recorded particles.

11. The method according to claim 1, wherein the transparent flow object is a transparent flow channel.

12. The method according to claim 1, wherein the medium includes one of a gas and a liquid.

\* \* \* \* \*